United States Patent Office 3,554,686
Patented Jan. 12, 1971

3,554,686
CELLULOSIC MATERIAL HAVING AN IMPROVED BALANCE BETWEEN APPEARANCE AND SERVICE PROPERTIES
William S. Tolgyesi, Silver Spring, Md., assignor to Cotton Producers Institute, Memphis, Tenn., a nonprofit corporation of Tennessee
No Drawing. Filed Oct. 2, 1967, Ser. No. 672,684
Int. Cl. D06m *13/34*
U.S. Cl. 8—115.6          6 Claims

ABSTRACT OF THE DISCLOSURE

In a durable-press process for cellulosic materials, a copolymer is first formed in a cellulosic material by copolymerization of a conventional polymer former such as an N-methylol compound or trisaziridinylphosphine oxide with a reactive polyfunctional comonomer such as urea or thiourea, which represses the ability of the polymer former to crosslink cellulose, the material being cured, preferably in a substantially dry system, under conditions such that a copolymer matrix is formed in the cellulose with relatively little or no crosslinking of the cellulose; and the cured, copolymer-bearing material is subsequently treated in liquid or vapor phase with a crosslinking agent such as dihydroxydimethylolethylene urea which reacts both with the copolymer and the cellulose and thereby upon re-curing of the material imparts to it improved crease retention and wrinkle recovery while preserving its breaking strength and abrasion resistance to a high degree.

BACKGROUND OF INVENTION

There has been a great increase in demand in recent years for cotton-containing textile materials which have improved shape holding properties, i.e., ability to retain pressed-in creases and to resist wrinkling. A variety of crosslinking agents and processes have heretofore been proposed for this purpose, as described, for instance, in U.S. Pats. 3,138,802 (Getchell) and 3,177,093 (van Loo et al.). In a more recently proposed treatment described in co-pending application Ser. No. 507,657 filed Nov. 15, 1965, now U.S. Pat. 3,472,606 (Getchell and Hollies) a relatively slow acting aminoplast precondensate is first wet-fixed to the cellulosic material at a high add-on and the material is only then crosslinked by a highly reactive crosslinking agent. However, the reduction of tensile strength, tear strength and abrasion resistance attending many of these known treatments severely detracts from the value of the obtained improvement in shape holding properties. In other cases, the previously proposed treatments are rather cumbersome to carry out on a commercial scale, as in requiring wet fixation in at least one of several steps.

SUMMARY OF INVENTION

In the present two-stage process, a reactive, polymer-forming monomer such as an easily hardenable dimethylol urea or melamine precondensate or trisaziridinylphosphine oxide (APO) is used in the first of two treating stages while its ability to crosslink the cellulose chains upon curing is suppressed by the inclusion in the first treating bath of a polyfunctional compound such as urea or thiourea in an amount such that the polymer former in this stage reacts preferentially with this compound rather than with the hydroxyls of the cellulose substrate; and only then is the material, which now has a copolymer cured within the fibers, further treated to effect the desired crosslinking. This latter treatment involves application in liquid or vapor phase of a reactive crosslinker such as dihydroxydimethylolethylene urea (DHDMEU), plus an appropriate catalyst when necessary, to the copolymer bearing material and a second cure which causes crosslinking and the desired imparting of shape retentive properties to the material. This second cure can be performed either before or preferably after the ultimate article such as a garment has been fabricated from the treated material. The presence of moisture ("wet fixation") is permissible during the polymer formation, but fixation by dry curing is preferred as the role of water as a swelling agent is apparently taken over by the urea or thiourea comonomer. The free urea and thiourea have melting points around the temperature at which the treated fabric is normally cured and hence tend to keep the cellulose swollen during the first stage cure.

The improved physical properties exhibited by fabrics treated in accordance with this invention are attributed to a flexible type of stabilization of the fiber structure involving exensive fiber-polymer crosslinks besides normal cellulose-cellulose crosslinks. Thus, it is hypothesized that an effect which has been sought by earlier workers is attained by introducing "long" crosslinks. On fabrics treated in accordance with the present two-step process an increase in wrinkle recovery is obtained which in typical cases is two or three times as high for every percent strength loss as in the case of fabrics treated by a conventional single-step process at similar DHDMEU add-on and wrinkle recovery range.

In the first stage of the present invention, the polymer former such APO or an N-methylol compound reacts with itself, with the thiourea or urea comonomer and with the cellulose. Homopolymerization of the ploymer former and formation of a copolymer with the urea or thiourea are desirable reactions while reaction with the cellulose to a high degree is not, because it interferes with or prevents the setting of creases or other shaping of the fabric even before the final crosslinking. The crosslinking agent applied in the second stage of this invention, such as DHDMEU, acts in its usual manner in crosslinking the cellulose and, in addition, apparently in crosslinking the copolymer formed in the first stage to the cellulose. This results in a more flexible type of stabilization of the fiber structure, and hence a more favorable balance of textile properties, than conventional crosslinking. Cellulose-cellulose crosslinking can be substantially totally suppressed by including a large excess of urea or thiourea relative to the polymer former in the treating solution in the first stage and thereby causing the crosslinker in the second stage to form crosslinks by reaction with the available reactive urea groups rather than directly by reaction with the hydroxyls of the cellulose.

DESCRIPTION OF THE INVENTION

In practicing the present invention the cellulosic material such as cotton or rayon or a blend containing cellulosic fibers is first padded in an aqueous monomer bath which contains (1) a reactive polymer-forming monomer such as a polyfunctional N-methylol compound or APO, (2) a polyfunctional comonomer which is more reactive with the aforementioned polymer-forming monomer than cellulose, and (3) usually a polymerization catalyst, as may be necessary. When using N-methylol compounds, it is desirable for the padding bath to have a pH between about 5 and 6 or 7 while with APO good results are obtained with the bath maintained at any pH between about 3 and 7, preferably between 3 and 5. In the case of N-methylol compounds, if the pH of the bath is too low, undesirable polymerization is apt to take place prematurely outside the fibers at low drying temperatures, before the material has become sufficiently dry and before the urea or urea comonomer can adequately exert its desired effect. By contrast, when the pH of the bath is within the preferred limits, the polymer formation takes place predominantly only after the material has become substantially dry and reached a relatively high temperature under which conditions the added reactive comonomer such as urea or thiourea can properly exert its intended crosslink suppressing effect. In addition, other additives conventionally used in the fabric treating art such as wetting agents, softeners and the like may likewise be included in the bath, depending on the effects desired.

In the first stage of the process, a variety of nitrogen-containing monomers can be used to form the desired copolymer with the bifunctional or polyfunctional comonomer, e.g. urea or thiourea. The polyfunctional comonomer is applied in a ratio of at least 0.25 mole per mole of polymer forming compound. One such compound with which this invention has been successfully demonstrated is trisaziridinylphosphine oxide (APO) which has given particularly satisfactory results when padding solutions containing from about 0.75 to about 3 moles of APO per mole of urea or thiourea were employed. APO is available in the trade as an 80% acetone solution which can be readily dissolved in water together with the appropriate proportion of urea or thiourea to form the desired padding bath.

To form the desired type of copolymers in the first stage of the process from N-methylol compounds with a minimum of crosslinking, it is desirable to include in the padding bath 1 part of urea or thiourea comonomer per 1 to 5 parts of N-methylol compound present (on a weight basis). The total concentration of the polymerizable monomers in such a bath may range between about 15 and 40%. No catalyst is required in such a system, but catalysts may be used to accelerate the polymerization. The material having the monomers applied thereto is then dried and heated at a temperature above 200° F. and below the charring temperature of the material until a copolymer is fixed thereto at a dry add-on of between about 5 and 20%.

For instance, in practicing the invention, pieces of cotton fabric of known conditioned weight may be immersed in an aqueous solution of the monomers at room temperature. About 50% to 90% wet pick-up is desirably applied to the fabric by the double-dip/double-nip method. Thereafter, the fabric is heated in the range from about 185° to 360° F. for from 5 to 40 minutes, either in a loose form or attached to tender frames in a high air velocity oven. A convenient procedure involves drying at a primary low temperature (e.g., 150° to 200° F.) followed by actual curing at a higher temperature (e.g., 5 to 10 minutes at between 300° and 360° F.) or in any event below the charring temperature of the material, whereupon the fabric is preferably washed to remove unreacted monomers therefrom and dried. A satisfactory cure can be obtained, for instance, by maintaining the treated and dried fabric in a forced-air oven for 5 to 10 minutes at 320° F. Somewhat longer residence times may be necessary at lower curing temperatures, and shorter times may be sufficient at higher curing temperatures, as can be readily determined by any person skilled in the art.

Instead of APO, various N-methylol compounds known to be used in resin treating cotton may likewise be used. These include the substantially water-soluble, easily hardenable precondensates which are obtained by condensation of formaldehyde with a compound such as a lower alkyl-substituted melamine or a urea. These precondensates are capable of being applied to cellulosic material from an aqueous solution to deposit therein from 8% to 20% or more polymer former based on dry weight of the material, and they are capable of being insolubilized in the material by either wet or dry cure. Good results are obtained, for instance, using triazine-type precondensates made by condensing one mole of melamine or an alkylsubstituted melamine with two or three moles of formaldehyde, i.e., dimethylol melamine or trimethylol melamine. Readily available commercial products useful in forming the desired type of copolymer herein include, for instance, "Permafresh-96," which is available as an aqueous solution containing essentially about 40% dimethylol urea, "Permafresh MEL", which is available as an aqueous solution containing essentially about 68% trimethylol melamine, and "Aerotex 23," which is available as an aqueous solution containing essentially about 50% of methylol triazine derivatives, e.g., a mixture of hexamethylol melamine and triazone.

To be applied by padding, one or more of the aforementioned N-methylol compounds and the urea or thiourea comonomer are dissolved in water to form a solution containing from about 15 to 40%, or preferably 20 to 30% total monomer. To facilitate the formation of the polymer in the fabric in the desired amount, it is usually desirable in these cases to add to the padding solution, as is otherwise well known in the art, a catalyst such as formic acid, hydrochloric acid, or, particularly, an acid-acting salt such as zinc nitrate, zinc chloride, magnesium chloride, ammonium chloride, aluminum chloride, sodium hydrogen phosphate, or sodium dihydrogen phosphate, etc. Such a catalyst may be added to the padding bath in a concentration of about between 0.1 and 2% based on the total weight of the bath. Formation of the insoluble copolymer in the fiber is aided by heat and acidity.

The crosslinking agent that may be used in the second stage of this process may be selected from a wide variety of compounds, as is well known in the art. Formaldehyde itself is one such useful crosslinker. However, other polyfunctional compounds capable of reacting with the active hydrogens of cellulose or of the copolymer formed in the first stage of this invention are similarly useful. It should be understood that the novelty herein lies principally and essentially in the above described formation of the copolymer under crosslink suppressing conditions prior to an otherwise conventional crosslinking treatment, rather than in any particular crosslinking treatment as such. Accordingly, for instance, N-methylol derivatives of acid amides such as the carbamates, e.g., hydroxyethyl carbamate or methoxyethyl carbamate, as well as N-methylol containing formaldehyde-urea condensates and formaldehyde-cyclic urea derivatives of many different kinds can generally be used as crosslinks under appropriate curing conditions. More particularly, the highly reactive condensates of formaldehyde and a 5-membered cyclic ethylene urea of the kind shown in U.S. Pat. 3,177,093, and especially products such as dimethylolethylene urea, dihydroxy-dimethylolethylene urea, etc., have been found very effective in the present invention, as have analogous derivatives of 6-membered cyclic propylene urea. Condensates having at least 1.5 moles of formaldehyde combined as methylol formaldehyde with a 5-membered or 6-membered cyclic urea nucleus are quite generally suitable and the dimethylol derivatives are preferred.

The crosslinker may be deposited in the cellulosic material at a relatively low add-on, e.g., 1 to 3% active monomer based on dry material. "Permafresh 183" is a commercially available solution of dihydroxy-dimethylolethylene urea ("DHDMEU") which is well suited for the present purpose. To bring about a proper cure of the crosslinker, an appropriate catalyst should usually be present in the material during the final curing stage. In the case of the amine-type crosslinkers, such as the cyclic ethylene ureas or triazones, one of the acid-reacting catalysts described earlier herein, such as zinc nitrate or zinc chloride, or magnesium chloride, may be used in accordance with otherwise well-known practice. For instance, the padding bath used in the second stage of the present process may comprise 10 to 25% of an active crosslinker such as DHDMEU, and 1 to 5% of a catalyst such as zinc chloride or zinc nitrate. In addition, the padding bath may include any conventional additives such as emulsified polyethylene (e.g., Mykon-SF) to serve as a softener, a non-ionic wetting agent such as an alkylaryl polyether alcohol (e.g., Triton X-100) to facilitate even distribution of the bath in the fabric, etc.

Instead of using conventional padding equipment, the treating solution may be applied to the cellulosic material by spraying or any other process known in the art for this purpose.

After application of the crosslinker to the cellulosic material, the latter is again dried and finally cured under conditions essentially the same as or similar to those described earlier herein in connection with the cure at the end of the first stage.

The final cure can be effected either directly with the material in a flat state or after a garment or other article has been completed from the treated and dried material.

The following examples are illustrative of the process of this invention and of the results obtained thereby. It should be understood, however, that these examples are not intended to be limiting and that many variations and modifications not specifically described herein can be made by persons skilled in the art without departing from the scope or spirit of this invention. Unless otherwise indicated, all percentages and ratios of materials are expressed in this specification on a weight basis.

Example 1

Samples of 80 x 80 mercerized cotton print cloth, Type 400 M, supplied by Test Fabrics, Inc., were treated and compared after different treatments. The data obtained are summarized in Table I below.

In this series of tests, the fabric samples of known conditioned weight were immersed at room temperature in the aqueous baths of indicated composition and padded to about 75% wet pick-up by a double-dip/double-nip method. Following the measurement of pick-up, the samples were dried and polymer was fixed therein by heating in a high air velocity oven while attached to tenter frames under light tension. All samples were washed and dried after the dry fixation of polymer at the end of the first stage and before the second stage DHDMEU treatment. Finally, the samples were machine-washed and tumble-dried and conditioned after the DHDMEU treatment for add-on determination and evaluation of properties.

As can be seen from the tabulated data, the conventional single-step DHDMEU treatment (Test No. 2) gives a much better wrinkle recovery and wash-wear rating than was obtained in the untreated control (Test No. 1) but such DHDMEU treatment reduced the original fabric strength by almost one-half. In contrast, the sample treated in accordance with this invention (Test No. 3), i.e., having the conventional DHDMEU treatment applied only after preliminary fixation of the APO-TU copolymer in the fabric, retained 74% of its original strength while possessing a wrinkle recovery and wash-wear rating

TABLE I.—APO-TU TREATMENT

A.—Polymer treatment:
    Bath composition: 20% APO (active), 8% thiourea (TU); total solids 28%.
    APO-TU molar ratio, 1:1.
    No catalyst.
    Dry fixation of polymer: 180° F. for 6 min. followed by 320° F. for 6 minutes.
B.—DHDMEU treatment:
    17% DHDMEU, 3% zinc nitrate.
    Measured add-on: 3.0-3.2%.
    Cure: 185° F. for 10 minutes, followed by 320° F. for 6 minutes.

| Test No. | Sample | APO-TU polymer add-on, percent | Wrinkle recovery, W+F, degrees Dry | Wet | Wash-wear ratings [a] T.D. | L.D. | Strength retention, percent |
|---|---|---|---|---|---|---|---|
| 1 | Untreated control | | 187 | 196 | 1 | 1 | 100 |
| 2 | DHDMEU control 3.2% add-on | | 265 | 238 | 5.0 | 4.0 | 54 |
| 3 | Treated (2-stage) | 18.3 | 286 | 241 | 4.5 | 3.0 | 74 |
| 4 | APO/TU only | 19 | 242 | 215 | 2.2 | 1.9 | 82 |

[a] The ratings of the samples were low due to handling during treatment and are given only for comparative purposes.

substantially as good as the sample which was subjected to the conventional DHDMEU treatment. Test No. 4 shows that application of the APO-TU copolymer, without the second stage crosslinking treatment, results in somewhat better strength retention than the sample treated in Test No. 3 but it has substantially poorer wrinkle recovery and poor wash-wear properties.

Other data obtained by the applicant and published in Textile Research Journal, vol. 37, page 300 (April 1967), which publication is incorporated herein by reference, show that varying the amount of crosslinker add-on from between a fraction of a percent to about 7% results in a detectable change in final textile properties. Add-ons between about 0.5 and about 3.5 or 4% give the best balance of properties. Low add-ons of crosslinker keep strength loss to a minimum but also contribute only little to any improvement in wet wrinkle recovery. On the other hand, high add-ons of crosslinker can improve wet wrinkle recovery to a very important degree but at the same time can cause a very substantial loss in strength. To obtain optimum results, the add-on of crosslinker after copolymer fixation should be chosen so as to give the best balance of desired properties. This can be readily determined by a few preliminary screening tests.

Example 2

A series of tests similar to those described in Example 1 were run substantially as described therein, except that the APO-TU mole ratio present in the padding bath used in the first stage of the process was varied to determine the effect thereof. Each cloth sample was tested both upon completion of the first stage (Samples "A") and again after completion of the second stage (Samples "B"). The results are summarized in Table II below.

TABLE II.—EFFECT OF APO-TU RATIO

A. Polymer treatment (Samples "A"):
  Solids content of APO-TU solutions: 28%.
  No catalyst.
  Dry fixation of APO-TU polymer (all samples): 6 min. at 185° F. followed by 6 min. at 320° F.
B. DHDMEU treatment (Samples "B"):
  Same as in Table I.

| Test No. | Sample | APO/TU, molar ratio | APO-TU add-on, percent | Wrinkle recovery, W+F, degrees | | Strength retention, percent | Wash-wear ratings a | |
|---|---|---|---|---|---|---|---|---|
| | | | | Dry | Wet | | T.D. | L.D. |
| 5 | A | 1/2:1 | 13.8 | 240 | 223 | 74 | | |
| | B | | | $273 | 249 | 74 | 4.5 | 3.5 |
| 6 | A | 3/4:1 | 17.8 | 244 | 235 | 81 | | |
| | B | | | 265 | 253 | 74 | 4.0 | 3.1 |
| 7 | A | 1:1 | 18.8 | 252 | 210 | 85 | | |
| | B | | | 279 | 246 | 67 | 4.3 | 3.3 |
| 8 | A | 1-1/4:1 | 20.4 | 257 | 220 | 80 | | |
| | B | | | 267 | 276 | 70 | 4.0 | 1.8 |
| 9 | A | 1-1/2:1 | 20.9 | 254 | 204 | 74 | | |
| | B | | | 278 | 222 | 77 | 3.7 | 3.0 |
| 10 | A | 2:1 | 20.7 | 256 | 207 | 70 | | |
| | B | | | 291 | 224 | 77 | 3.9 | 3.0 |
| 11 | A | ∞ | 13.7 | 267 | 214 | 67 | | |
| | B | | | 302 | 231 | 48 | 4.2 | 3.1 | a The ratings are low due to handling during treatment and are given for comparative purposes only.

It can be seen from Table II that the polymer yield increased with increasing APO-TU ratio up to about 1:1 or 1.25:1, as did the dry wrinkle recovery and strength before DHDMEU treatment. The polymer yield and dry wrinkle recovery remained fairly constant as the APO-TU ratio was further increased up to about 2:1, but the wet wrinkle recovery tended to decrease somewhat as the APO-TU ratio was increased beyond about 1.25:1. The increase in dry wrinkle recovery going from Test No. 5 to Test No. 8 can be readily explained in terms of more crosslinking taking place at higher APO-TU polymer deposits.

The subsequent DHDMEU treatment seemed to be favorably influenced by the effect of increasing APO-TU ratio, in the sense that the dry wrinkle recovery tended to increase with increasing ratio while the strength remained constant or decreased slightly. At the 2:1 ratio, a high wrinkle recovery of 290° and good strength retention (77%) were attained. On the other hand, the wash-wear ratings and wet wrinkle recovery decreased at the higher APO-TU ratios, indicating the importance of the thiourea monomer in the system. In the absence of any thiourea (Test No. 11B), the strength retention was actually poorer than in the conventional DHDMEU treatment (Test No. 2, Table I).

The inclusion of a small concentration such as between 0.1 and 1% based on total solution, of an acidic catalyst such as a free acid or acidic salt or sodium dihydrogen phosphate can be beneficial, but it is not necessary in view of the relatively high reactivity of the APO-TU monomer system.

Example 3

In this series of tests, urea was used in place of thiourea as the comonomer with APO. Otherwise, the procedure was substantially the same as described in Examples 1 and 2 above. The effect of two different ratios of APO/urea, and of 0, 1 and 3% catalyst concentration is illustrated. The results are summarized in Table III below.

The data show that polymer add-on increases with increasing APO/urea ratio, catalyst concentration and cure severity. However, the yield of the APO/urea copolymer was much lower than in the case of the APO/TU copolymer prepared under analogous conditions. The dry wrinkle recovery of the "A" samples (not treated with DHDMEU) was very high in all cases except Test No. 14, ranging from 275° to 310°, indicating that more severe curing conditions than optimum were used. Note, however, that in Test No. 14, wherein substantially milder curing conditions were used, a good polymer add-on and desirably moderate wrinkle recovery values were obtained in the A stage.

Similarly as the add-on, the dry wrinkle recovery increased with increasing catalyst concentration APO/urea ratio and cure severity, but by proper balance of both composition and cure severity, optimum results can be achieved as desired. The strength retention was not affected significantly by the APO/urea ratio, catalyst concentration or cure severity, and ranged between about 60 and 70%.

These data indicate that the phosphate catalyst activates the aziridinyl ring and that urea is less active in the polymerization reaction than thiourea. Urea ap- TABLE III.—APO-UREA TREATMENT: EFFECT OF APO-UREA RATIO AND CATALYST CONCENTRATION A.—Polymer treatment: Dry curing of APO-urea: 6 min. at 185° F. followed by 10 min. at 320° F.a APO-urea add on (calculated): 21.9%.
B.—DHDMEU treatment: Actual add-on: 3.2-3.4%.

| Test No. | Sample | NaH2PO4 in bath, percent | APO-urea add-on, percent | Wrinkle recovery, W+F, degrees | | Strength retention, percent | Wash-wear ratings | |
|---|---|---|---|---|---|---|---|---|
| | | | | Dry | Wet | | T.D. | L.D. |
| 12 | A | 0.0 | b 8.2 | 276 | 253 | 69 | | |
| | B | | | 300 | 265 | 62 | 4.9 | 3.9 |
| 13 | A | 1.0 | b 11.1 | 292 | 233 | 62 | | |
| | B | | | 282 | 254 | 65 | 4.4 | 3.6 |
| 14 | A | 1.0 | b 7.3 | 259 | 248 | 72 | | |
| | B | | | 312 | 261 | 62 | 5.0 | 3.8 |
| 15 | A | 3.0 | b 17.4 | 296 | 231 | 69 | | |
| | B | | | 282 | 255 | 65 | 4.7 | 3.4 |
| 16 | A | 0.0 | c 8.8 | 294 | 246 | 62 | | |
| | B | | | 298 | 243 | 59 | 4.9 | 3.8 |
| 17 | A | 1.0 | c 13.5 | 310 | 244 | 65 | | |
| | B | | | 293 | 261 | 65 | 4.6 | 3.8 |
| 18 | A | 3.0 | c 18.4 | 311 | 229 | 69 | | |
| | B | | | 294 | 223 | 65 | 4.8 | 3.1 | a In Test 14, the sample was heated for 6 minutes at 185° F. followed by 10 minutes at only 240° F.
b APO-urea molar ratio=0.6:1.0.
c APO-urea molar ratio=1.2:1.

parently cannot compete with the cellulose hydroxyls for the available aziridinyl ring quite as efficiently as thiourea does. Therefore, under comparable conditions, a greater share of the APO tends to be utilized for crosslinking the cellulose in the presence of urea than in the presence of thiourea.

Except in the non-catalyzed reactions, the DHDMEU treatment actually decreased the dry wrinkle recovery value, did not significantly change the strength retention, and tended to reduce the elongation. Here again, it can be surmised that the DHDMEU split more bonds between the polymer and the fiber than it replaced by formation of new crosslinks. As the APO/urea itself produced a highly set fabric, the DHDMEU treatment could not be expected to have a major effect on any of the investigated characteristics of the fabric.

The wet wrinkle recovery of the "A" samples was not consistently affected by the APO/urea ratio, but was generally reduced by increasing catalyst concentration. After DHDMEU treatment, this trend was again marked. There was no consistent effect of the APO/urea ratio and catalyst concentration on the wash-wear behavior of the samples, nor on their elongation at break.

The following general conclusions may be stated based on this work:

(a) Increasing APO concentrations tend to contribute to higher dry wrinkle recovery values and higher wash-wear ratings, both initially and finally, have little effect on strength, and lower the extensibility and wet wrinkle recovery values.

(b) The effect of urea or thiourea concentration is opposite to that of the APO concentration. The range of optimum APO/TU (or urea) mole ratios can be set at between about 0.75 to 1.5, depending on requirements.

(c) The milder the conditions of polymerization, the more the fabric retains low wrinkle recovery values prior to crosslinking. This is desirable in a two-stage process. However, mild conditions of polymerization also give lower polymer yield and thereby tend to make the process more expensive. The range of optimum conditions embraces cure times of from about 4 to 5 minutes at 320° F. to about 20 minutes at 140° F.

(d) The permissible level of DHDMEU add-on is to some extent determined by the APO/TU (or urea) content of the material if strength loss is to be maintained within desirable limits. Accordingly, the normal optimum range for APO/urea or APO/thiourea polymer add-on is between about 5 and 25%, preferably between 10 and 20%. For the higher wrinkle recovery gain at the lowest strength loss, the DHDMEU crosslinker add-on should be about 10 to 25% of the APO copolymer add-on, or about 2 to 4% DHDMEU add-on (absolute) based on the cellulose.

(e) As between urea and thiourea, thiourea, being the more active comonomer in the polymerization reaction, permits less crosslinking of the cellulose by APO prior to the DHDMEU crosslinking treatment. Therefore, it makes shaping the fabric easier. The use of urea as a comonomer, on the other hand, permits the use of somewhat smaller polymer add-ons to achieve comparable physical characteristics. The choice, therefore, depends entirely on the final requirements. Indeed, in commercial practice, one may prefer to form copolymers from other monomer combinations such as combinations of urea or thiourea with dimethylol urea, melamine, triazone, or the alkylated (methylated, ethylated, propylated, or butylated) derivatives of such compounds. The operability of a few of such other systems is illustrated in the following portions of this specification.

In all cases described below, a 70% wet pick-up was obtained by the fabric samples in each bath described; and, except when otherwise noted, the fabric treated was cotton twill.

Example 4

In this series of tests, the effects of various combinations representative of the present two-step process were compared with conventional single-step DHDMEU (Permafresh 183) treatments.

The results of the conventional pad-dry-cure process employing DHDMEU are summarized in Table IV for reference purposes.

The indicated aqueous treating solution was in each case padded onto the fabric at room temperature. Generally speaking, the padding operation should be carried out at a temperature between about 60° and 100° F. At higher temperatures premature polymerization can take place in the bath. As indicated by the data in Table IV, the conventional treatments which give satisfactory dry wrinkle recovery and wash-wear rating (Samples 23, 24 and 25) also result in very severe degradation of breaking strength. With the milder treatments (Samples 19–22), the breaking strength retention is better but the appearance characteristics of the fabric are only fair to poor.

Table V shows a series of tests wherein the twill fabric was first treated with an aqueous solution containing the indicated concentrations of dimethylol urea ("Permafresh–96"), thiourea and zinc salt catalyst, from which a copolymer was formed in the fabric by drying and curing under the indicated conditions, whereupon each sample was treated with the same DHDMEU bath as described for Sample 23 (Table IV), the same padding, drying and curing conditions being used as in Sample 23.

Table VI shows a similar series of samples treated in accordance with the present two-stage process, except that in this series the dimethylol urea (Permafresh–96) was copolymerized with urea instead of the thiourea used in Table V.

TABLE IV.—CONVENTIONAL DHDMEU CROSSLINKING (CONTROL)

| | Bath composition a | | Fabric characteristics after curing b | | |
|---|---|---|---|---|---|
| Sample No. | Percent DHDMEU | Percent Zn(NO$_3$)$_2$ | Breaking strength retention, percent | Dry wrinkle recovery, degrees | Wash-wear rating (Eastman) |
| 19 | 12 | 1 | 80 | 167 | 1 |
| 20 | 12 | 2 | 56 | 236 | 3− |
| 21 | 17 | 1 | 78 | 178 | 2 |
| 22 | 17 | 2 | 56 | 242 | 3 |
| 23 | 17 | 3 | 49 | 258 | 4− |
| 24 | 20 | 3.7 | 46 | 265 | 4 |
| 25 | 25 | 4 | 39 | 280 | 4 | a 2% "Mykon SF" polyethylene softener and 0.5% "Trixon X-100" alkylaryl polyether wetting agent were included in all crosslinking baths.
b Drying at 185° F. for 10 minutes, cure at 320° F. for 6 minutes.

TABLE V.—P-96/THIOUREA COPOLYMER FIXATION FOLLOWED BY DHDMEU CROSS-LINKING

| Sample No. | Polymer formation ||||||  Fabric characteristics after second-stage crosslinking [a] |||
| --- | --- | --- | --- | --- | --- | --- | --- | --- | --- |
| | Monomer bath concentration, percent ||| Time (min.) | Temp., °F. | Percent add-on | Breaking strength retention, percent | D.W.R., degrees | Wash-wear |
| | P-96 | TU | ZnCl₂ | | | | | | |
| 26 | 15 | 7 | 1 | 10 | 284 | 6.7 | 54 | 292 | 4+ |
| 27 | 15 | 10 | 1 | 10 | 284 | 7.1 | 60 | 285 | 3+ |
| 28 | 15 | 7 | 1 | 5 | 320 | 6.5 | 61 | 287 | 4− |
| 29 | 20 | 10 | 1 | 10 | 320 | 10.2 | 56 | 292 | 4− |
| 30 | 20 | 10 | 0.5 | 10 | 320 | 9.2 | 57 | 284 | 4− |
| 31 | 15 | 10 | [b] 1 | 10 | 284 | 7.8 | [c] 63 | 277 | 3+ |

[a] As in Sample 23 (See Table IV).
[b] Zn(NO₃)₂ instead of ZnCl₂.
[c] Crosslink cure at 338° F. for 8 minutes.

TABLE VI.—P-96/UREA COPOLYMER FIXATION FOLLOWED BY DHDMEU CROSSLINKING

| Sample No. | Polymer formation |||||| Fabric characteristics after second-stage crosslinking [a] |||
| --- | --- | --- | --- | --- | --- | --- | --- | --- | --- |
| | Monomer bath composition, percent ||| Time (min.) | Temp., °F. | Percent add-on | Breaking strength retention, percent | D.W.R., degrees | Wash-wear |
| | P-96 | Urea | ZnCl₂ | | | | | | |
| 32 | 15 | 7 | 1 | 10 | 284 | 7.1 | 61 | 287 | 4− |
| 33 | 15 | 7 | 1 | 5 | 320 | 6.9 | 63 | 294 | 4 |
| 34 | 15 | 10 | 1 | 5 | 320 | 6.7 | 57 | 282 | 4 |
| 35 | 20 | 5 | 0.5 | 10 | 320 | 9.2 | 61 | 278 | 4 |
| 36 | 20 | 10 | 0.5 | 10 | 284 | 5.7 | 56 | 288 | 4 |

[a] As in Sample 23 (see Table IV).

TABLE VII.—EFFECT OF VARIATIONS IN SECOND-STAGE CROSSLINKING ON FABRIC CONTAINING P-96/UREA COPOLYMER

| Sample No. | Polymer add-on (P-96/urea), percent | Crosslinking |||| Final fabric characteristics |||
| --- | --- | --- | --- | --- | --- | --- | --- | --- |
| | | Bath concentrations, percent || Cure conditions || Breaking strength retention, percent | D.W.R., degrees | Wash-wear |
| | | DHDMEU | Zn(NO₃)₂ | Time (min.) | Temp., °F. | | | |
| 37 | [a] 8.9 | 12 | 2 | 6 | 320 | 66 | 276 | 3+ |
| 38 | | 17 | 3 | 4 | 320 | 64 | 283 | 3+ |
| 39 | | 17 | 3 | 8 | 320 | 62 | 286 | 3+ |
| 40 | | 17 | 3 | 4 | 338 | 59 | 280 | 4− |
| 41 | | 17 | 3 | 6 | 338 | 57 | 290 | 4− |
| 42 | [b] 6.1 | 17 | 3 | 2 | 338 | 56 | 279 | 4− |
| 43 | | 17 | 3 | 4 | 320 | 58 | 281 | 4− |
| 44 | | 17 | 3 | 8 | 320 | 55 | 287 | 4− |

[a] Prepared from solution containing 20% dimethylol urea (Permafresh 96), 6% urea, 0.5% ZnCl₂ at 320° F. in 10 min.
[b] As above, but solution contained only 15% dimethylol urea (Permafresh 96), 6% urea and 0.5% ZnCl₂.

TABLE VIII.—EFFECT OF DIFFERENT COPOLYMERS USED IN COMBINATION WITH DHDMEU CROSSLINKING

| Sample No. | Polymerization |||| Fabric characteristics after crosslinking [f] |||
| --- | --- | --- | --- | --- | --- | --- | --- |
| | Monomers and their concentrations || Time (min.) | Temp., °F. | Percent add-on | Breaking strength retention, percent | D.W.R., degrees | Wash-wear |
| | N-methylol compound | Coreactants | | | | | | |
| 45 | P-MEL [a], 15% | TU [b], 5% | 10 | 284 | 9.2 | 64 | 287 | 3+ |
| 46 | P-MEL, 15% | TU, 5%; EG [c], 15% | 10 | 284 | 8.5 | 67 | 276 | 3+ |
| 47 | P-MEL, 15% | TU, 5%; Gly [d], 10% | 10 | 284 | 8.8 | 63 | 282 | 3+ |
| 48 | P-MEL, 15% | Urea, 5% | 5 | 320 | 9.1 | 63 | 285 | 4− |
| 49 | P-MEL, 15% | Urea, 8% | 5 | 320 | 6.0 | 58 | 278 | 4− |
| 50 | Aerotex 23 [e], 15% | TU, 7% | 10 | 284 | 8.4 | 60 | 281 | 3+ |
| 51 | Aerotex 23, 15% | Urea, 10% | 5 | 320 | 7.4 | 60 | 288 | 4− |

[a] Permafresh MEL (commercial trimethylol melamine).
[b] Thiourea.
[c] Ethyleneglycol.
[d] Glycerine.
[e] Aerotex 23 (commercial methylol triazine derivative).
[f] As in Sample 23 (Table IV).

TABLE IX.—TREATMENT OF DIFFERENT FABRICS

| Sample No. | Type of fabric | Type of polymer treatment | Polymer add-on, percent | Fabric characteristics after crosslinking [1] |||
| --- | --- | --- | --- | --- | --- | --- |
| | | | | Breaking strength retention, percent | D.W.R., degrees | Wash-wear |
| 52 | Printcloth | Control (crosslinked) | | 37 | 292 | 4− |
| 53 | | 15% P-96, 6% urea | 5.3 | 50 | 302 | 4− |
| 54 | | 15% P-96, 8% urea | 4.3 | 53 | 298 | 4 |
| 55 | | 15% P-96, 6% urea | 7.1 | 58 | 295 | 4− |
| 56 | Broadcloth | Control (crosslinked) | | 45 | 290 | 4− |
| 57 | | 20% P-96, 10% TU | 7.0 | 55 | 298 | 3+ |
| 58 | Duck | Control (crosslinked) | | 46 | 283 | 4− |
| 59 | | 15% P-96, 6% urea | 4.8 | 62 | 292 | 4− |
| 60 | | 15% P-96, 8% urea | 3.6 | 54 | 293 | 4− |

[1] As in Sample 23 (Table IV).

Table VII shows the effect of variations in second stage cross-linking on the fabric containing two different copolymers of dimethylol urea (Permafresh-96) with urea. It will be noted that Samples 42–44 had a lower add-on of copolymer and the copolymer was formed from a bath containing a higher proportion of urea monomer than Samples 37–41. It is apparent that very good dry wrinkle recovery and excellent wash-wear properties, with good breaking strength retention, can be obtained under a variety of curing conditions when the crosslinking treatment is applied to a material having a copolymer fixed therein in accordance with this invention.

Table VIII shows that good results can be obtained when copolymers of different N-methylol compounds and urea or thiourea are affixed in the twill fabric prior to the conventional crosslinking step.

Finally, Table IX shows the effect of the present two-step process on different cotton fabrics. Each of the types of the cotton cloths tested showed a distinctly better dry wrinkle recovery and strength retention when treated in accordance with the present two-step process than when only simply crosslinked by the conventional one-step process.

The scope of the invention which is to be protected by patent is particularly pointed out in and defined by the appended claims.

I claim:

1. In combination with a process wherein a shape-retentive textile article is made from a cellulose-containing material by application thereto of a reactive crosslinking agent and curing thereof, the improvement which comprises pre-conditioning said cellulose-containing material prior to said application of said crosslinking agent by applying thereto an aqueous treating bath containing (a) a substantially water-soluble, polymer forming-compound capable of crosslinking cellulose by reaction with its hydroxyl groups which compound is selected from the group consisting of trisaziridinylphosphine oxide, hardenable melamine-formaldehyde precondensates and hardenable urea-formaldehyde precondensates, and (b) at least 0.25 mole per mole of said polymer-forming compound of a polyfunctional co-monomer selected from the group consisting of urea and thiourea and heating the material in a substantially dry state at a temperature above 200° F. and below the charring temperature of the material until a copolymer is fixed therein at a dry add-on of between about 5 and 20% and a copolymer-containing cellulose matrix is formed.

2. A process according to claim 1 wherein said polymer-forming compound is dimethylolurea.

3. A process according to claim 1 wherein said polymer-forming compound is a precondensate of one mole of a melamine with two to three moles of formaldehyde.

4. A two-step process for imparting durable-press properties to a cellulose-containing fabric which comprises:
(A) applying to said fabric an aqueous bath containing (a) at least one water-soluble polymer-forming compound selected from the group consisting of trisaziridinylphosphine oxide, hardenable melamine-formaldehyde precondensates and hardenable urea-formaldehyde precondensates, and (b) a co-monomer of the class consisting of urea and thiourea, the mole ratio of said polymer-forming compound to co-monomer in said bath being between about 0.75/1 and 3/1 in case of the polymer-forming compound being trisaziridinylphosphine oxide and the mole ratio being between about 1/1 and 5/1 in case of the polymer-forming compound being a melamine-formaldehyde or urea-formaldehyde pre-condensate, and drying and curing the thus treated fabric by maintaining it at a temperature above 200° F. and below its charring temperature until a copolymer is fixed therein at a dry add-on of between about 5 and 20%; and
(B) aplying to said copolymer-containing fabric a reactive cellulose crosslinking agent, and curing it.

5. A process according to claim 4 wherein the bath in step (A) contains a water-soluble melamineformaldehyde or urea-formaldehyde precondensate as the polymer-forming compound.

6. A process according to claim 4 wherein the bath in step (A) contains dimethylolurea as the polymer-forming compound and monomeric thiourea as the co-monomer in the presence of an acidic catalyst; and wherein the crosslinking agent in step (B) comprises dihydroxy-dimethylolethylene-urea.

References Cited

UNITED STATES PATENTS

| | | | |
|---|---|---|---|
| 3,350,162 | 10/1967 | Beck | 8—115.6 |
| 3,190,715 | 6/1965 | Gordon | 8—116 |
| 3,407,026 | 10/1968 | Mauldin | 8—115.6 |

GEORGE F. LESMES, Primary Examiner

B. BETTIS, Assistant Examiner

U.S. Cl. X.R.

8—116.2; 117—138.5